United States Patent
Lipczynski et al.

(10) Patent No.: US 6,695,916 B1
(45) Date of Patent: Feb. 24, 2004

(54) PROTECTIVE PAINT APPLICATIONS TO TIRES

(75) Inventors: George Jeffrey Lipczynski, Hudson, OH (US); John Michael Maloney, Akron, OH (US); Robert Dean Irwin, Uniontown, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 47 days.

(21) Appl. No.: 09/979,817

(22) PCT Filed: Jul. 31, 2001

(86) PCT No.: PCT/US99/11753

§ 371 (c)(1), (2), (4) Date: Dec. 20, 2001

(87) PCT Pub. No.: WO00/72981

PCT Pub. Date: Dec. 7, 2000

(51) Int. Cl.⁷ .................................................. B05C 1/00
(52) U.S. Cl. ........................ 118/232; 118/258; 118/211; 427/286; 427/428
(58) Field of Search ................. 118/416, 207, 118/232, 252, 258, 211, 409; 427/286, 428; 156/116; 152/524

(56) References Cited

U.S. PATENT DOCUMENTS

| | | |
|---|---|---|
| 1,908,823 A | 5/1933 | Daniell |
| 1,921,579 A | 8/1933 | Otto |
| 2,394,318 A | 2/1946 | Mc Chesney |
| 2,445,728 A | 7/1948 | Stevens |
| 2,487,196 A | 11/1949 | Sternad et al. |
| 2,488,340 A | 11/1949 | Shook et al. |
| 2,605,195 A | 7/1952 | Boughton |
| 2,995,177 A | 8/1961 | Tolenen |
| 3,070,478 A | 12/1962 | Riddle |
| 3,125,481 A | 3/1964 | Mallory et al. |
| 3,524,784 A | 8/1970 | Isaksson |
| 3,802,978 A | 4/1974 | Barnett |
| 3,962,394 A | 6/1976 | Hall |
| 3,997,385 A | 12/1976 | Osborne |
| 4,069,080 A | 1/1978 | Osborne |
| 4,151,027 A | 4/1979 | Schelkmann et al. |
| 4,428,789 A | 1/1984 | Masaaki et al. |
| 5,015,505 A * | 5/1991 | Cetnar ........................ 427/286 |
| 5,256,445 A * | 10/1993 | Nojiri et al. ................ 427/155 |
| 5,443,683 A * | 8/1995 | Garrett ........................ 156/578 |
| 5,573,625 A * | 11/1996 | Lovell et al. ................ 156/356 |
| 5,698,064 A | 12/1997 | Fujimoto |
| 6,262,148 B1 * | 7/2001 | Cheng et al. ................ 523/458 |

FOREIGN PATENT DOCUMENTS

| | | |
|---|---|---|
| EP | 59091026 | 5/1984 |
| JP | 59-91026 | 5/1989 |
| JP | 5-169-565 | 7/1993 |

OTHER PUBLICATIONS

XP–02126584 Dec. 18, 1991.

* cited by examiner

Primary Examiner—Richard Crispino
Assistant Examiner—Michelle A Lazor
(74) Attorney, Agent, or Firm—Brouse McDowell; Roger D. Emerson

(57) ABSTRACT

A paint applying roller is positioned over the sidewall of a tire rotating about a vertical axis and the roller is vertically movable into contact with the sidewall to apply and spread protective paint over white sidewall surfaces.

3 Claims, 7 Drawing Sheets

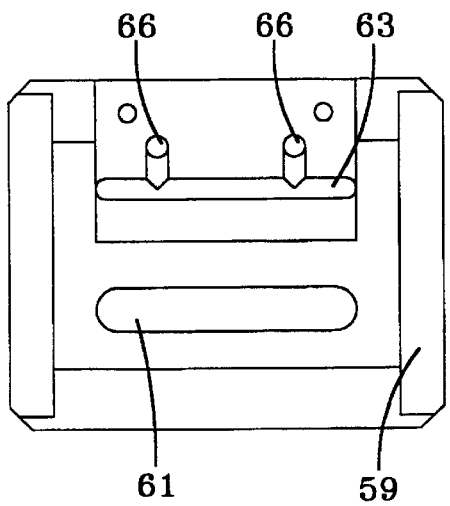
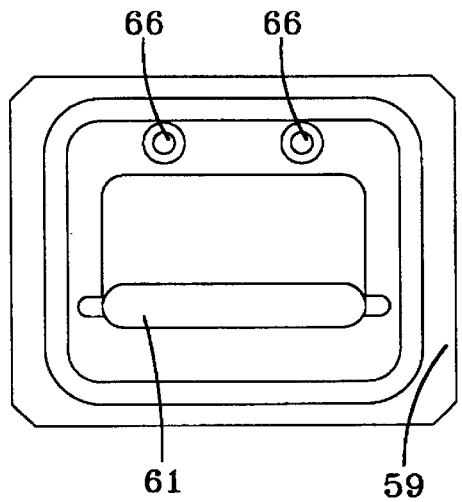
FIG-5    FIG-6
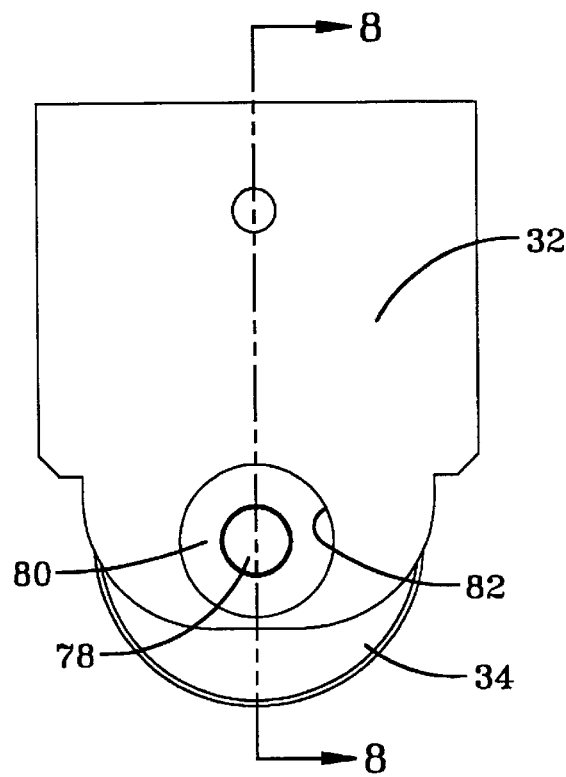
FIG-7

PROTECTIVE PAINT APPLICATIONS TO TIRES

TECHNICAL FIELD

This invention relates to paint appliers for applying protective paint to tire sidewalls and especially to raised continuous white sidewall surfaces and raised letter surfaces after removal of the black rubber covering to expose the white rubber.

BACKGROUND ART

A paint applier for applying protective paint to raised letters on both sides of a motorcycle tire is shown in U.S. Pat. No. 5,256,445. A series of horizontal rollers driven by a motor receive the paint from a paint reservoir in a horizontal nip between a flanged roller and a knurled roller which carries the paint to a horizontal nip between the knurled roller and a smooth applier paint roller in engagement with the raised numerals on the tire. The speed of the motor must be regulated to transfer the desired amount of paint to the sidewall. The apparatus includes a rough grinder and a finishing grinder for removing the rubber covering the sidewall. In order to operate the paint applier, the roller must be positioned to contain paint in the horizontal nips and therefore the tire must he supported for rotation about a horizontal axis.

DISCLOSURE OF INVENTION

The present invention is directed to a paint applier for applying paint to a white sidewall surface of a tire rotatable about a generally vertical axis and to a method of applying paint and then spreading the paint over the surface of raised letters or sidewall to cover and smooth the surface during and after application. The unique capability of the apparatus to spread the paint over the tire sidewall surface in the horizontal position is especially important in protecting raised white sidewall letters which are ground with the sidewall in a horizontal position.

In accordance with one aspect of the invention there is provided a method of applying protective paint to a white sidewall surface of a tire comprising:

(a) mounting a tire in a horizontal position for rotation about a vertical axis characterized by, (b) lowering a paint applier roller with a grooved surface into driven engagement with the white sidewall surface, (c) communicating paint to the grooved surface of said roller, (d) rotating the tire causing rotation of the roller and application of paint to the white sidewall; and, (e) continuing to rotate the tire and the roller with said grooved surface to spread and smooth the paint to cover the white sidewall surface.

In accordance with another aspect of the invention there is provided a paint applier for a tire sidewall comprising:

(a) a support means for holding a tire with a sidewall in a horizontal position, (b) means for rotating said tire around a vertical axis, (c) a paint applier assembly positioned over said sidewall characterized by, (d) a paint reservoir having a paint supply slot at the bottom of said reservoir, (e) a roller rotatably mounted on said reservoir and positioned under said slot for receiving paint from said container, (f) means for lowering said paint applier assembly and said roller into engagement with said sidewall so that upon rotation of said tire said roller is rotated and paint applied and spread on said sidewall.

BRIEF DESCRIPTION OF DRAWINGS

FIG. 5 is a bottom view of the applier and scraper member of FIG. 4.

FIG. 6 is a top view of the applier and scraper member.

FIG. 7 is an end view of the paint reservoir housing and paint applying roller.

DETAILED DESCRIPTION OF THE INVENTION

Figure 1:
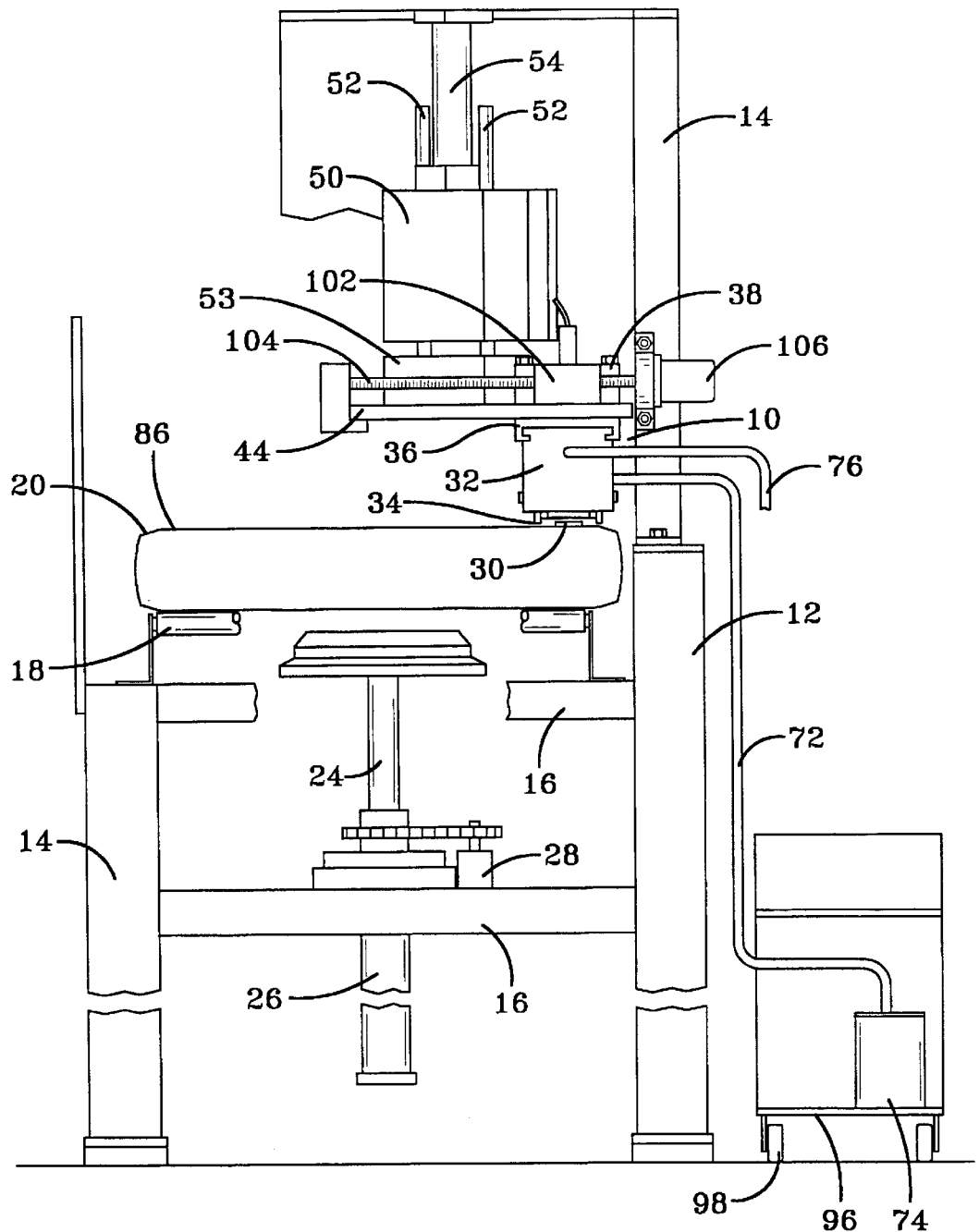
FIG. 1 is an elevation with parts broken away of a white sidewall grinder with a paint applying assembly mounted on the grinder frame and connected to a portable paint supply and suction unit having controls for feeding paint to a paint reservoir having a roller with a grooved surface for applying paint and spreading it on the surface of raised sidewall letters.
Figure 2:
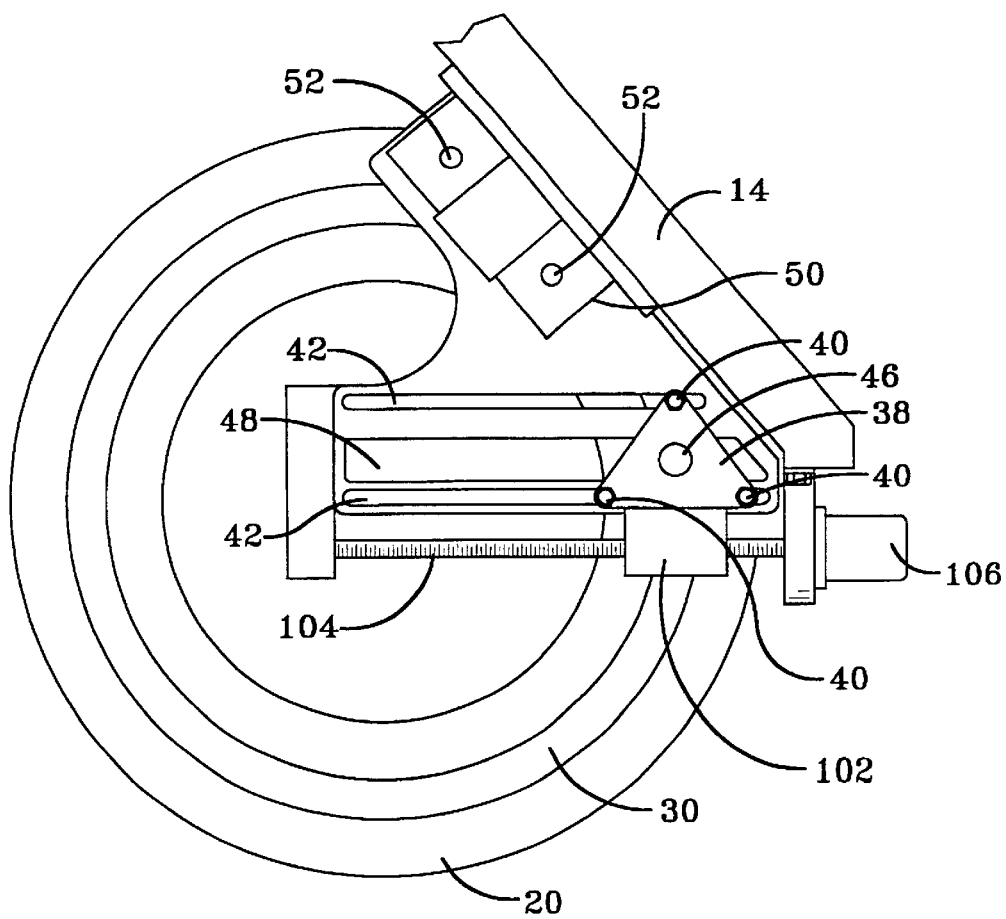
FIG. 2 is a fragmentary plan view of the paint applying roller and paint reservoir housing shown in FIG. 1 mounted on a linear motion slide component for raising the roller for transferring the tire being painted and having a ball screw linear motion component for adjusting the position of the paint applying roller radially of the tire.
Figure 3:
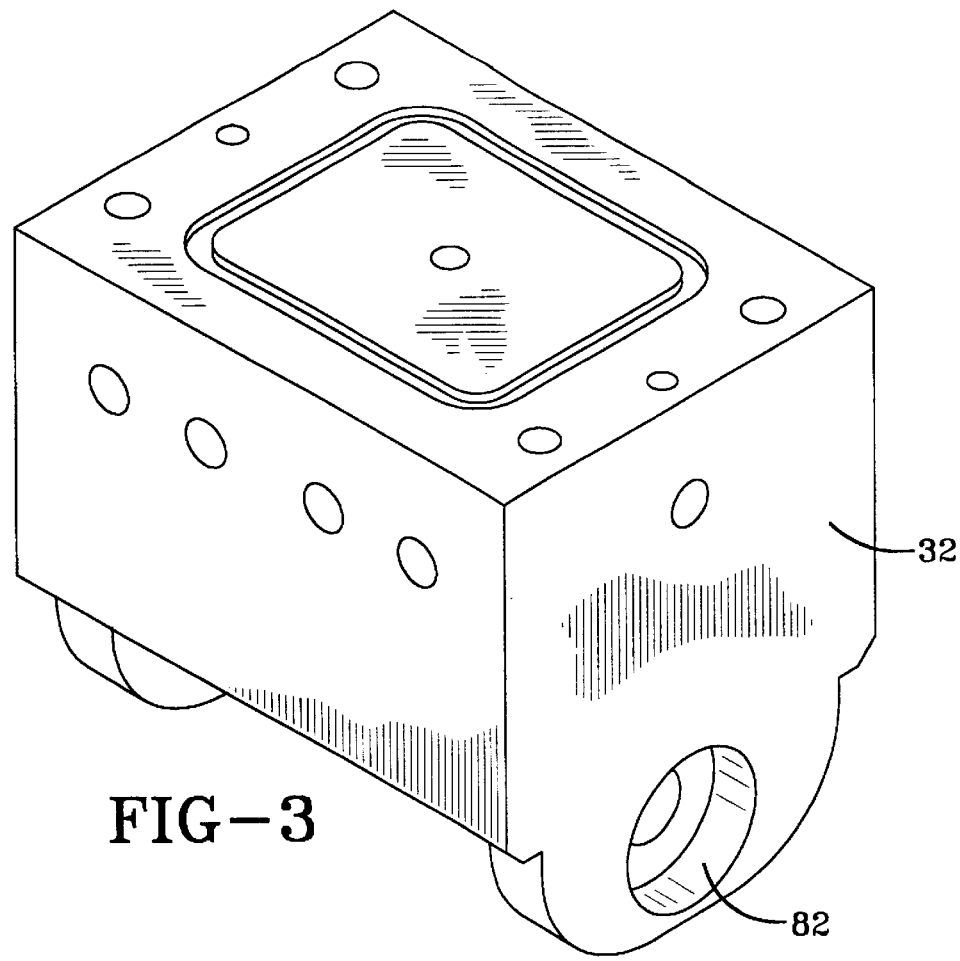
FIG. 3 is a view in perspective of the paint reservoir housing.

Referring to FIGS. 1 and 2, a protective paint applier assembly 10 is shown mounted on a tire supporting frame 12, which may be a frame of a white sidewall grinder. The frame 12 has vertical supports 14 connected by horizontal members 16 and a conveyor 18 for supporting a tire 20. A rotatable chuck 22 is mounted on a shaft 24, which may be raised or lowered by a piston-cylinder assembly 26 mounted on one of the horizontal members 16. A motor 28 mounted on the tire supporting frame 12 is connected by gears or other suitable means to the shaft 24 for rotating the chuck 22 when in engagement with the tire 20. As shown in FIGS. 1 and 2, the tire 20 is broken away to show raised letters 30 which have the black cover strip removed to expose the white rubber.

In accordance with this invention, the paint applier assembly 10 includes a paint reservoir housing 32 supporting a paint applying roller 34 and slidably mounted in a spacer plate 36 connected to a shroud member 38 by bolts 40 extending through slots 42 in a slide plate 44. The shroud member 38 has a photoeye 46 extending through a central slot 48 in a vertically adjustable slide plate 44 to monitor and control the paint level in the reservoir housing 32. The paint pump is actuated in response to signals from the photoeye 46 indicating a need for more paint or a satisfactory supply of paint in the reservoir.

The slide plate 44 is bolted to a linear positioner 50 fastened to the vertical support 14 of the tire supporting frame 12. Guide rods 52 are mounted on a mounting block plate 53 fastened to the slide plate 44 and are slidably mounted in the positioner 50 to maintain the position of the slide plate as it moves vertically. A double acting piston cylinder 54 may be mounted in the positioner 50 and is in engagement with the mounting block plate 53 on the slide plate 44 for pressing the plate downward and thereby press the paint applying roller 34 against the raised letters 30 sidewall of tire 20.

Figure 4:
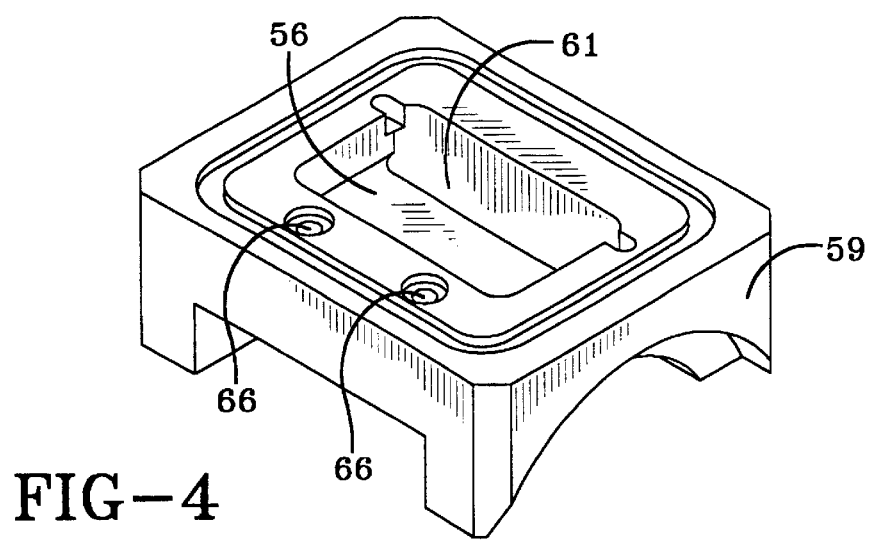
FIG. 4 is a view in perspective of the applier and scraper member.

Referring to FIGS. 3, 4, 5, 6, 7, 8 and 9, a more detailed showing of the paint reservoir housing 32 and paint applying roller 34 is shown. Within the housing 32 is a paint reservoir cavity 56. Inserted in the cavity 56 is a paint applier and scraper member 59 which covers the bottom of the cavity 56. As shown in FIGS. 4, 5 and 6, the scraper member 59 has a paint applying slot 61 in communication with the paint reservoir cavity 56. An excess paint removing slot 63 is also provided in the bottom surface of the scraper member 59 and is in communication with a source of vacuum through conduits 66 in the scraper member and connecting conduits 68 in the paint reservoir housing 32.

A supply of paint may be communicated to the paint reservoir cavity 56 through conduits 70 in the paint reservoir housing 32 connected to tubing 72 in communication with a paint supply, such a paint can 74. A similar vacuum tubing 76 may be connected to the vacuum conduits 68 in the housing.

Figure 8:
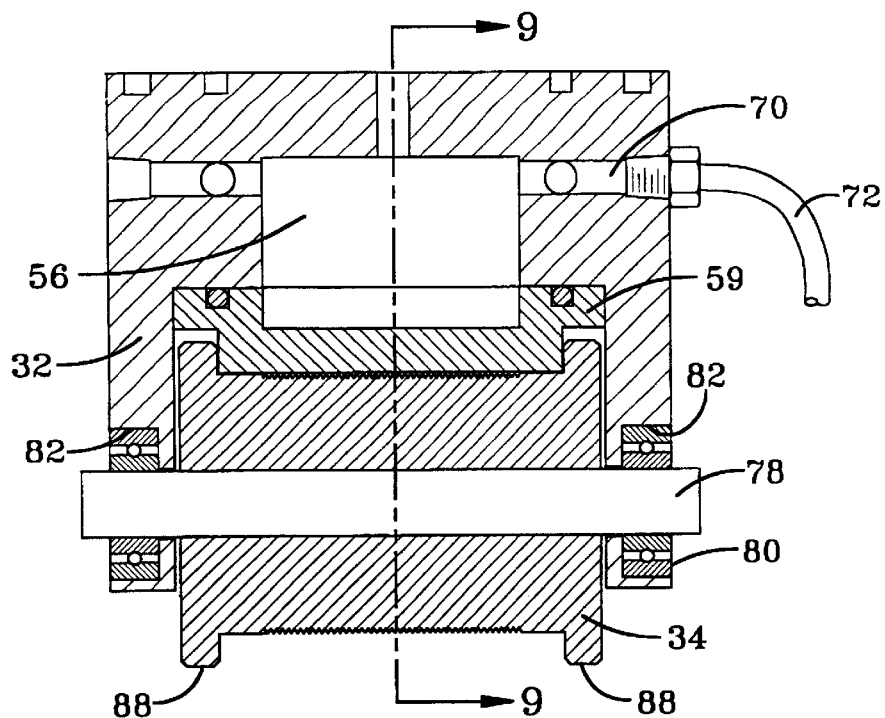
FIG. 8 is a section taken along lines 8—8 in FIG. 7.
Figure 9:
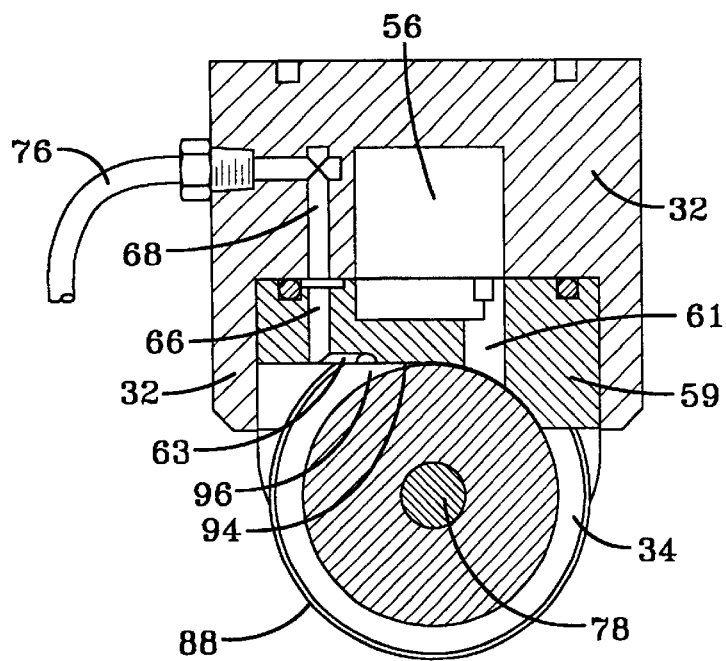
FIG. 9 is a section taken along the lines 9—9 in FIG. 8.

As shown in FIGS. 8 and 9, the paint applying roller 34 is mounted on a shaft 78 rotatable in bearings 80, supported in recesses 82 to permit free rotation of the roller upon engagement of a roller edge wheel 84 with the tire sidewall 86. Preferably the roller edge wheels 84 have knurled surfaces 88 for improved traction with the tire sidewall 86.

Figure 10:
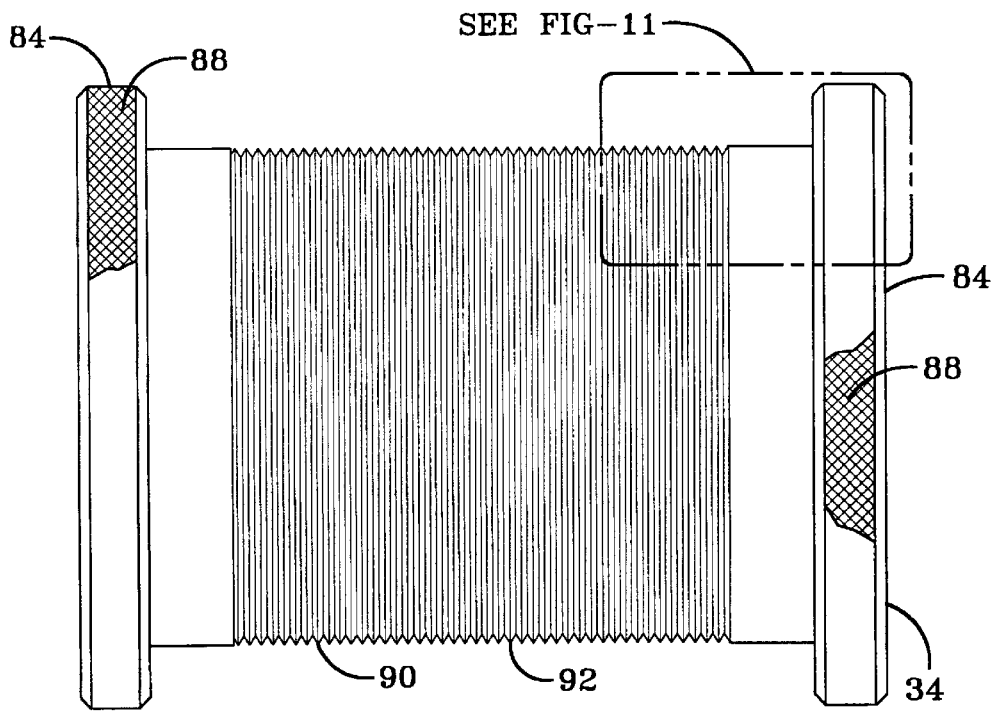
FIG. 10 is an elevation of the paint applying roller.

Although in the preferred embodiment shown in FIGS. 1 and 10 the roller 33 has two roller edge wheels 84 of increased diameter for engaging the sidewall 86 of the tire, additional spacer wheels (not shown) may be added to prevent contact of the roller 33 with the tire sidewall 86 between the raised letters 30. The spacer wheels may be fastened to the rollers 33 or may be separated and rotatably mounted for rotation about the same axis as the roller.

Figure 11:
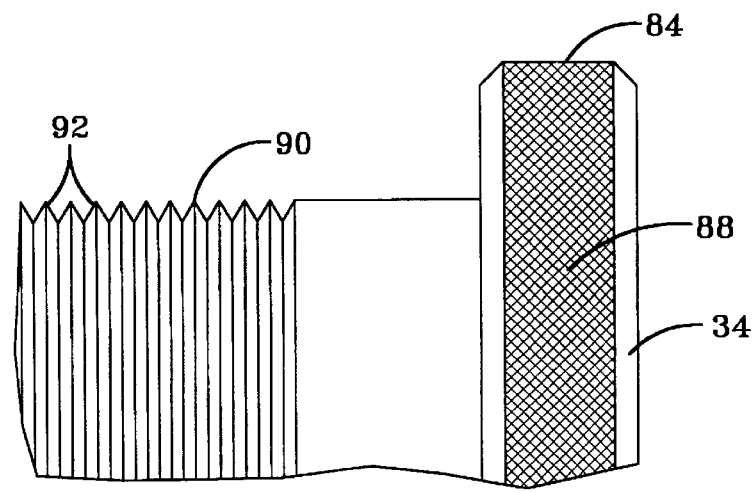
FIG. 11 is a fragmentary enlarged view of the threads and knurling on the roller.
Figure 12:
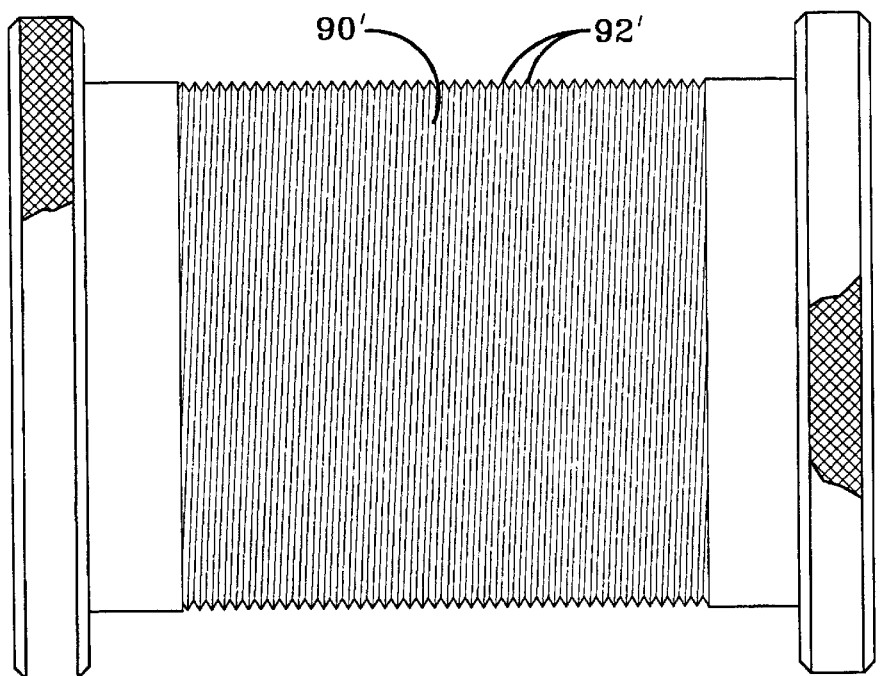
FIG. 12 is an elevation view of the paint applying roller.
Figure 13:
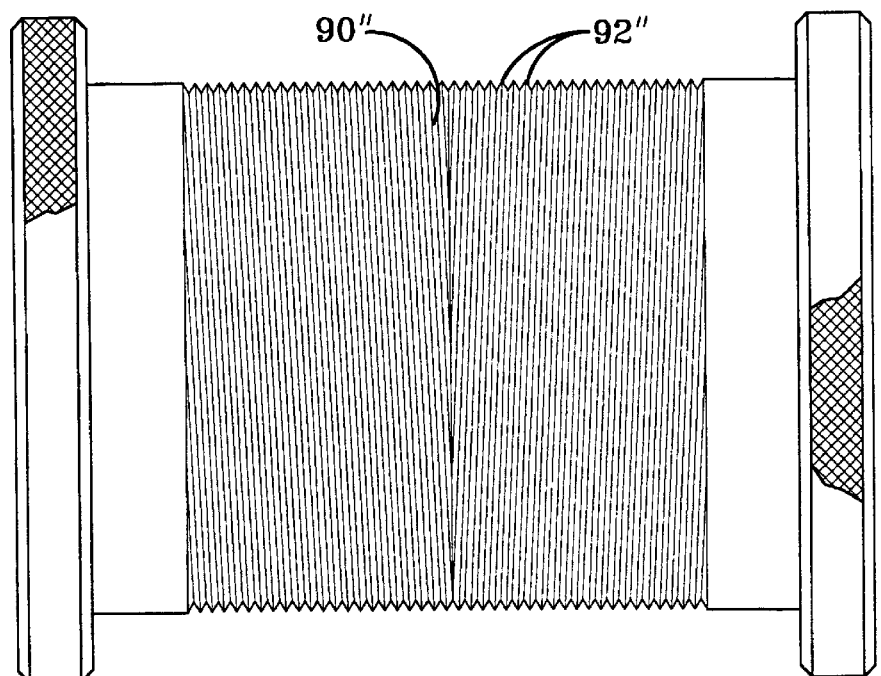
FIG. 13 is an elevation view of the paint applying roller.

As shown in FIG. 10, a paint applying surface 90 of the roller 34 has machined grooves 92 with threads having a pitch from 0.015 inches (0.038 cm) to 0.045 inches (0.114 cm) and preferably 0.031 inches (0.079 cm) and with an included angle of from 45 degrees to 75 degrees and preferably 60 degrees for retaining paint communicated to the roller through slot 61 from the paint reservoir cavity 56. The grooves 92 not only retain the paint for spreading on, the raised letters 30 of the tire 20, but the threads also spread and smooth the paint during the revolutions of the tire following the initial application revolution. In some applications the threads of the grooves 92 may have no pitch. In other applications the pitch may be toward the other side. In still another application the threads of the grooves 92 have pitches from the center to the edges. For example, in FIGS. 10 and 11, the paint applying roller has grooves with threads of no pitch and an included angle of 60 degrees. In FIG. 12 the paint applying roller 90' has grooves 92' with threads of a pitch of 0.031 inches (0.079 cm) and an included angle of 60 degrees toward one side of the roller. In FIG. 13 the paint applying roller 90" has grooves 92" with the threads of the grooves having pitches of 0.031 inches from the center of the roller to the edges with an included angle of 60 degrees.

Referring to FIG. 9, the scraper member 59 has a machined slot to regulate the flow of paint through the paint applying slot 61 and scrape paint left on the roller surface 90 at position 96 where it can be removed by the vacuum in communication with the paint removing slot 63.

A white sidewall painter cart assembly 96 is mounted on wheels 98 for transporting paint and other controls to different location where paint is to be applied. A brake 100 attached to the cart assembly 96 may be actuated to hold the cart assembly in position next to the tire supporting frame 12. The cart assembly 97 includes a paint delivery system to maintain the paint reservoir cavity level while recirculating paint through a filter to keep the paint fresh and clean via a closed loop supply system. The level sensor photoeye 46 (not shown) insures that there is a constant volume of paint available for filling the paint applying surface 90 of the roller 34 so that there is consistency in the paint lay down. The roller 34 may be made of clear plastic for quick operator inspection and be of low inertia to minimize roll slippage. A thread cleaner with filtered suction cleaner (not shown) may also be positioned adjacent the roller 34 to remove contaminants.

In operation a controller, which may also be the controller for a white sidewall grinder may be used to position the paint applier assembly 10 and advises a paint applier positioner of the home position required for the tire 20 to be painted. The tire is centered, inflated and the rim flange width adjusted to place the white sidewall in a level plane. The paint applier assembly 10 is lowered to the tire 20 and pressure is maintained against the tire by the linear positioner 50. The machine controller initiates the paint cycle at the conclusion of the grind cycle. The controller also insures that the paint applying roller 34 is in contact with the tire 20 for two full tire revolutions. An optional camera system may be used to identify any white that is uncovered after two tire revolutions. The camera system would signal that there is white showing after two revolutions and the paint apply cycle may then be extended as required. The paint applying roller 34 may continue to apply paint freshening up the surface with the threads 92 spreading the paint filling up any voids.

A pump (not shown) is mounted on the cart assembly 96 to keep the paint reservoir cavity 56 full. A pump is provided to return used paint to the reservoir.

The paint level sensor such as a photoeye 46 in mounted over the paint reservoir housing 32 to insure that there is a constant volume of paint available in the reservoir cavity 56 for the paint applying roller 34 to have consistency in pain t lay down. The paint applying roller 34 is self cleaning with the residue in the nip 95 removed by vacuum in communication the vacuum tubing 76. The residue is passed through a filter 96 with the clean paint recycled into the paint can 74. A flow sensor may be provided in the supply tubing 72 to monitor the supply line and detect a plugged filter or broken piping. Also a flow sensor may be used to monitor the return line to detect plugged lines.

Preferably the system completes a paint apply cycle and two tire revolutions at 20 rpm. A layer of wet paint having a thickness of 0.006 inches (0.0015 cm) plus 0.002 inches (0.005 cm) or minus 0.001 inches (0.0025 cm) is applied over the white surfaces of the raised letters 30.

A separate system, preferably connected with the factory air suctions the refuse from the clean out well of the paint reservoir housing 32, filters the impurities and returns the clean paint to the paint delivery supply. In the embodiment described, the height of the raised letters 30 after grinding is approximately 0.100 inches (0.254 cm) and the width of the letters is 1.10 inches (2.79 cm).

Referring to FIGS. 1 and 2, the paint reservoir housing 32, spacer plate 36 and shroud 38 may be adjusted on the slide plate 42 by a ball screw linear motion unit 102. This unit may be controlled automatically by rotating the ball screw 104 with a motor 106 having position feedback. A controller will download a position to the motor 106 and an encoder (not shown) will identify the current position and adjust if necessary. This will allow for automatic set-up changes.

The present embodiment is mounted on a white sidewall grinder frame 12 and applies the protective paint after grinding off the black cover strips to expose the white rubber. This process may produce dust which could contaminate the paint on the paint applying roller and therefore a retractable housing may be provided for movement over the paint applier applying assembly during the grinding process.

While a certain representative embodiment and details have been shown for the purpose of illustrating the invention, it will be apparent to those skilled in the art that various changes and modifications may be made therein without departing from the scope of the invention.

Having thus described the invention, it is now claimed:

1. A paint applier for a tire sidewall comprising:
   (a) a support means for holding a tire with a sidewall in a horizontal position including a white sidewall grinder having a frame, a paint applier assembly mounted on a linear positioner attached to said frame for movement vertically toward and away from a paint apply position over said sidewall, a rotatable chuck mounted on a vertical shaft for rotating said tire about a vertical axis, and means for raising and lowering said shaft to place said tire in a paint apply position for application of paint to said sidewall,
   (b) said paint applier assembly having a paint reservoir with a paint supply slot at the bottom of said reservoir, said reservoir being mounted on a slide plate fastened to said linear positioner and said slide plate having a slide extending generally radially of said rotatable chuck for adjusting the radial position of said reservoir,
   (c) a roller rotatably mounted on said reservoir and positioned under said slot for receiving paint from said reservoir, and,
   (d) means for lowering said paint applier assembly and said roller into a paint apply position for engagement with said sidewall so that upon rotation of said tire said roller is rotated and paint applied and spread on said sidewall,
   (e) means for applying downward pressure of said roller against said tire sidewall.

2. The paint applier of claim 1 further characterized by said means for applying downward pressure of said roller against said tire sidewall includes a double acting piston cylinder assembly.

3. The paint applier of claim 2 further characterized by said reservoir being slidably mounted in said slide of said slide plate and ball screw means connected to said reservoir and said slide plate for adjusting the position of said roller in a direction radially of said tire.

* * * * *